July 10, 1934.  P. R. MORRISON  1,965,853
CONSTANT VELOCITY UNIVERSAL JOINT
Filed June 3, 1931  2 Sheets-Sheet 1

INVENTOR
PAUL R. MORRISON
BY A. B. Bowman
ATTORNEY

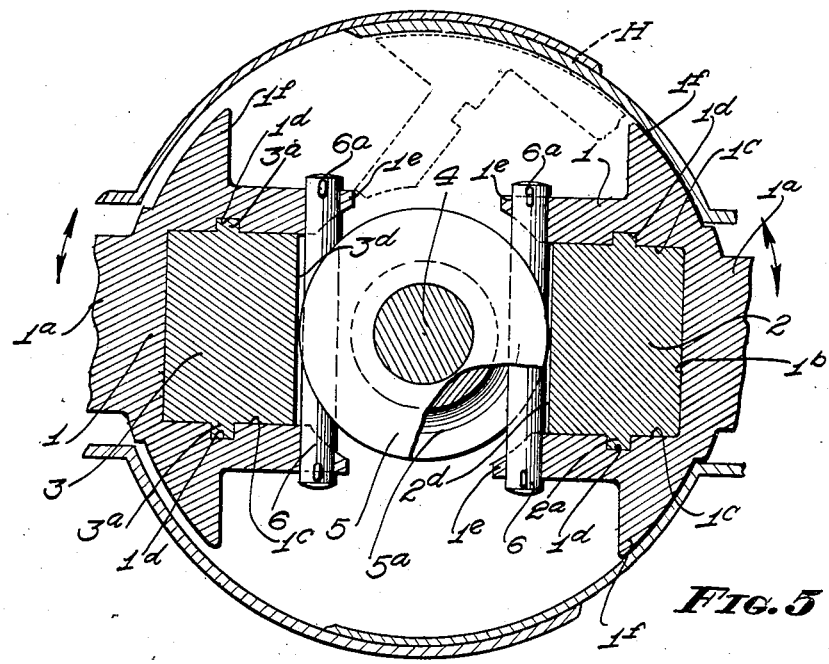
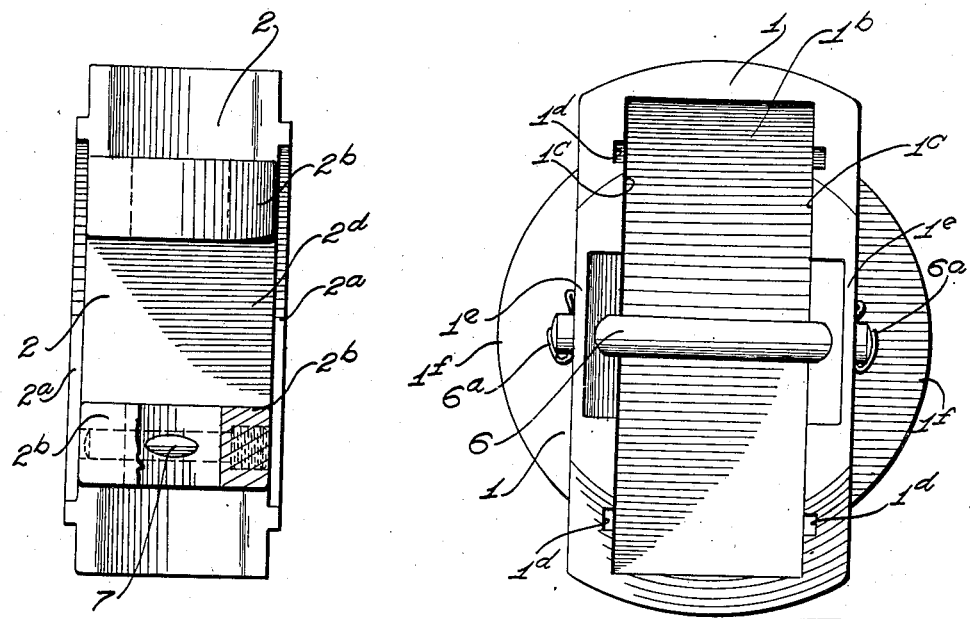

Patented July 10, 1934

1,965,853

UNITED STATES PATENT OFFICE 1,965,853

CONSTANT VELOCITY UNIVERSAL JOINT

Paul R. Morrison, Ontario, Calif.

Application June 3, 1931, Serial No. 541,825

8 Claims. (Cl. 64—91)

My invention relates to constant velocity universal joints, and the objects of my invention are:

First, to provide a universal joint of this class which is both compact and sturdy of construction;

Second, to provide a universal joint of this class in which the driving and driven shafts maintain equal velocities for all possible angular relations of the two shafts and for every degree of rotation thereof;

Third, to provide a universal joint of this class in which friction losses are reduced to a minimum for all angular relations of the driving and driven shafts whereby wear is reduced to a minimum;

Fourth, to provide a universal joint of this class in which the driven shaft is capable of considerable angular displacement with respect to the driving shaft without materially decreasing efficiency or causing undue wear, thus providing a universal joint which is particularly adapted for use in connection with front wheel drive vehicles;

Fifth, to provide a universal joint of this class which incorporates a novel means of locking the several members against axial displacement so arranged that the efficiency of the joint is not materially affected when subjected to axial strains, yet is particularly easy to assemble;

Sixth, to provide a universal joint of this class which, when used in conjunction with a close fitting housing, acts upon the lubricant enclosed with the joint in said housing so as to force the lubricant back and forth through and around the various moving parts of the joint, this being true even though the housing is allowed to rotate with the universal joint so that centrifugal force tends to hold the lubricant against the walls of the housing and Seventh, to provide a universal joint of this class in which the number of parts are reduced to a minimum and are so designed as to be particularly economical of construction, thereby providing a universal joint which is extremely economical of manufacture without sacrificing strength or efficiency in operation.

Figure 1:
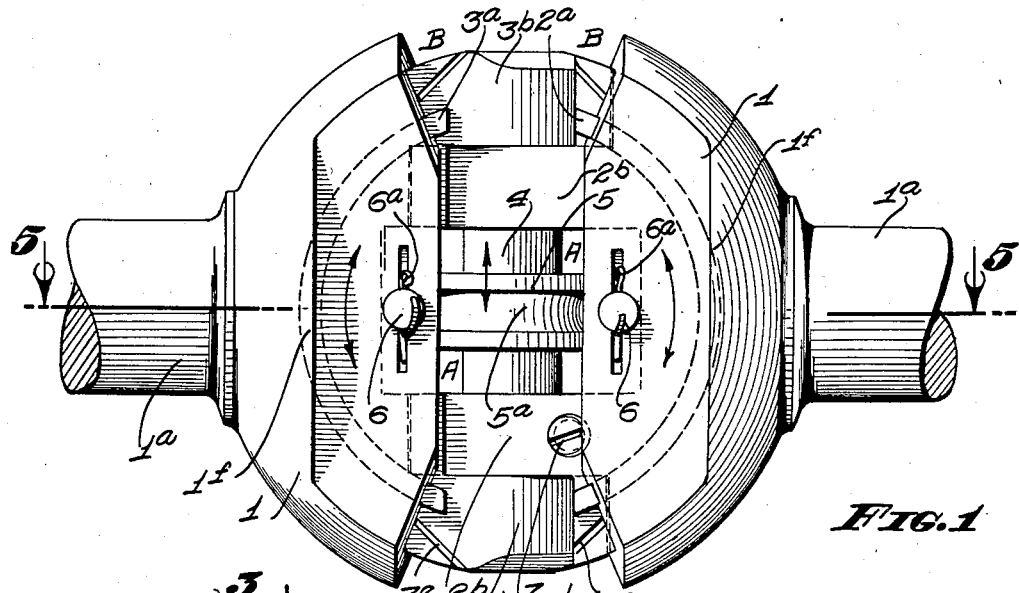
Figure 2:
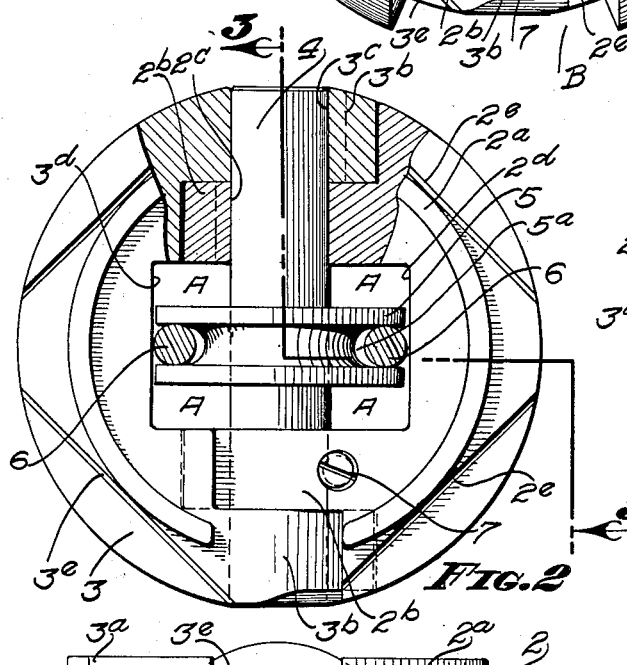
Figure 3:
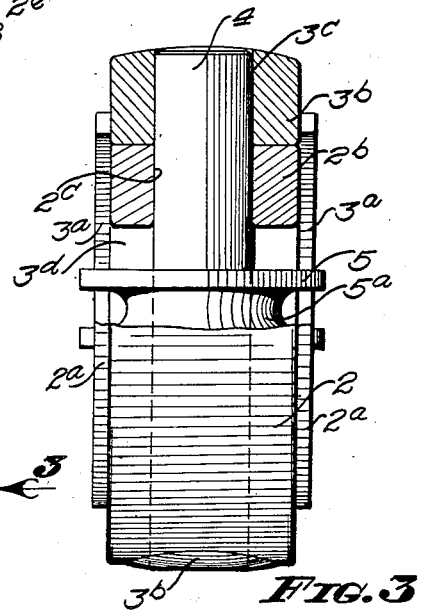
Figure 4:
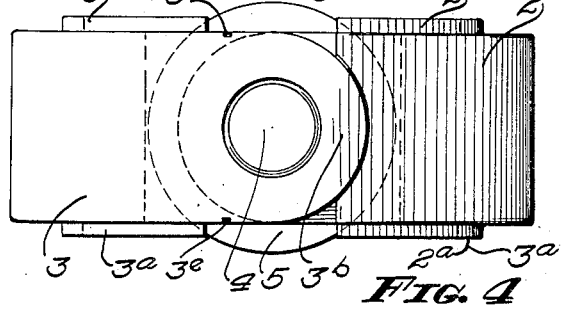

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is an elevational view of my universal joint with the shafts joined thereto shown fragmentarily; Fig. 2 is an elevational view similar to Fig. 1 with the outer connecting members removed and parts and portions as shown in section to facilitate the illustration; Fig. 3 is a partial sectional, partial elevational view also with the outer connecting members removed, taken through 3—3 of Fig. 2; Fig. 4 is an elevational view thereof taken at right angles to Fig. 2; Fig. 5 is a sectional view of the assembled universal joint taken through 5—5 of Fig. 1; Fig. 6 is an end elevational view of the inner coupling members; and Fig. 7 is an end elevational view of one of the outer coupling members with a centering pin shown in position.

Similar characters of reference refer to similar parts and portions throughout the several views of the drawings.

Outer coupling members 1, inner coupling members 2 and 3, journal shaft 4, centering disk 5, and centering pins 6 constitute the principal parts and portions of my novel universal joint.

Two outer coupling members 1 are provided which are identical in construction. Each outer coupling member is in the form of a segmental zone of a sphere centered upon the radius line thereof. The arcuate side of each outer coupling member is less than a semi-circle. Centered upon this side and extending outwardly therefrom is a stem or shaft $1a$. Formed in the other or substantially flat side of each outer coupling member 1 is a depression or recess $1b$, in the form of a cylindrical segment. Thus, each depression $1b$ includes an arcuately formed base portion conforming to the curvature of the convex side of the outer coupling members, and oppositely arranged parallel disposed side walls $1c$. Formed in each side wall $1c$, is an arcuate channel $1d$ which follows the curvature of the depression $1b$.

A pair of inner connecting members 2 and 3 are provided which in most respects are similar in construction. The inner coupling member 2 is in the form of a cylindrical segment and is adapted to fit snugly within either depression $1b$. The sides of the coupling member 2 are provided with ridges $2a$ which are curved in the form of arcs and are adapted to interlock with the channels $1d$ as shown best in Fig. 5. With this arrangement, the connection between the inner coupling member and outer coupling member may be relatively loose without undue axial play therebetween. Further, any axial strain between the coupling members cannot cause them to wedge or otherwise bind together.

The flat edge of the inner coupling member 2 opposite from its arcuate edge is provided with a pair of parallel disposed spaced apart projections or bearing brackets $2b$ which are provided with alined openings $2c$ therethrough. The bearing brackets $2b$ are spaced inwardly from the extremities of said flat edge.

Between the projections $2b$, the coupling member 2 forms a slot $2c$ which receives the centering disk and centering pin to be described hereinafter.

The other inner coupling member 3 is formed similar to the inner coupling member 2, it being adapted to fit in either one of the depressions 1a and is provided with arcuate ridges 3a on opposite sides adapted to interlock with the channels 1d. The flat edge of the inner coupling member 3 opposite from its curved edge is provided at its extremities with projections or bracket bearings 3b which are adapted to fit over the projections 2b. The projections 3b are provided with alined openings 3c therein. Between the projections 3b, but spaced therefrom is a slot 3d corresponding to the slot 2d.

The openings 2c and 3c of the two inner coupling members occupy a common axis when the bracket bearings are overlapped and are adapted to receive a journal shaft or pin 4 which extends the full diameter of the inner coupling members. The two coupling members when so joined are complementary and together form a complete circle with their arcuate edges sharing a common center of curvature intersecting the axis of the hinge pin 4 at right angles thereto. The common center of curvature of the inner coupling members is also the common center of rotation of the outer coupling members thereon, the several coupling members being assembled with one outer coupling member 1 interlocking with each of the inner coupling members 2 and 3 as shown in Figs. 1 and 5.

Slidably mounted upon the journal shaft 4 within the corresponding slots 2d and 3d of the two inner coupling members is a centering disk 5. The axial extent of the centering disk 5 is sufficient to form a sliding connection which will not bind when the disk is engaged by one margin. The periphery of the disk 5 is provided with a channel 5a. The side walls of the outer coupling members 1 overhang the slotted portions 2d and 3d of the inner coupling member as shown best in Fig. 5, as indicated by 1e.

The overhanging portions 1e of each outer coupling member is adapted to receive a centering pin 6 which extends therebetween. The centering pins 6 pass across the slots 2d and 3d substantially tangentially through opposite sides of the channel 5a provided in the centering disk so as to shift the centering disk axially upon the hinge pin 4. The centering pins are disposed at right angles to the hinge pin 4, and also at right angles to and intersecting the axes of their respective shafts 1a, whereby said centering pins, regardless of the movement of the several coupling members, at all times occupy a plane which makes equal angles with the axes of the two shafts 1a. Inasmuch as the plane of the channel 5a is at right angles to the hinge pin 4 and coincides with the common plane of the two centering pins 6, said hinge pin is at all times maintained with its axis bisecting the angle formed between the two shafts 1a. Therefore, the two shafts 1a at all times move with the same angular velocity.

The centering pins 6 are held in position by any suitable means such as cotter keys 6a.

The hinge pin 4 is held against axial displacement by means of a key member 7 which extends through one of the bearing brackets 2b and 3b so as to intersect the periphery of the hinge pin.

In order to facilitate lubrication of the connections between the inner coupling members and the outer coupling members, said inner coupling members are provided with channels 2e and 3e respectively. These lubricating channels extend diagonally across the sides of the inner coupling members in substantially tangential relation with the ridges 2a and 3a as shown best in Fig. 2. One extremity of each channel is exposed in the space between the coupling members 1 as shown best in Fig. 1 and the other end of each channel terminates near the innermost part of the recesses 1b.

It is preferred to mount the universal joint in a relatively close fitting housing H which is indicated diagrammatically and by dotted lines in Fig. 5. Opposite sides of each outer coupling member 1 are provided with lugs 1f. The radially outward peripheries of these lugs conform to the normal spherical curvature of the outer coupling member and extend adjacent the inner walls of the housing H as shown in Fig. 5.

With this arrangement, the space within the housing is divided by the joint structure into two chambers which are in communication through small passages A formed by portions of the slots 2d and 3d of the inner coupling members not occupied by the centering disk and journal shaft. These chambers are also in communication through relatively small passages B formed between the ends of the outer coupling members, the walls of the housing and the extremities of the inner coupling members.

When the coupling members move from the solid line position to the dotted line position shown fragmentarily in Fig. 5, the joint structure acts as a pump whereby lubricant within the housing is forced through the relatively small openings A and B and consequently passes around the moving parts of the joint so that the lubricant is forced between the various moving surfaces. When the opposite movement of the joint takes place, the lubricant is forced back through the passages A and B again supplying the moving parts with lubricant. This pumping action takes place twice for each revolution of the shaft 1 whenever the shafts are in angular relation with each other; the greater the angular relation of the shafts, the greater the pumping action of the joint structure. Thus when the relative movement of the parts of the joint increases, the quantity of lubricant forced around the moving parts is likewise increased.

This pumping action of the universal joint upon the lubricant occurs whether the housing revolves with the joint or is fixed. If the housing revolves and the lubricant by centrifugal action is thrown against the inner walls thereof, the lugs 1f of the outer coupling members 1 skim the lubricant from the inner periphery of the housing and force it through the passages A and B.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a universal joint, a pair of complementary semi-circular members, bearing brackets extending from each of said semi-circular members and sharing a common axis, a journal pin interlocking said bearings and extending the full diameter of said semi-circular members, said bearing brackets grouped adjacent the ends of said journal pin exposing the central portion of said journal pin, a centering disk slidably mounted upon the central portion of said journal pin, coupling members fitted upon each of said semi-circular members and shiftable about an axis at right angles to said journal pin, shafts extending from said coupling members, and centering pins supported by said coupling members engageable with said centering disk, said centering pins disposed so as to occupy a common plane forming equal angles with said shafts, said centering disk arranged to maintain the axis of said journal pin at right angles to the common plane of said centering pins.

2. In a centering means for constant velocity universal joints including a pair of outer coupling members, shafts extending therefrom and an inner coupling member journaled in each outer coupling member, of a hinge means connecting said inner coupling members comprising, interlocking hinge elements grouped adjacent the extremities of said inner coupling members forming a space therebetween, and a hinge pin extending the full distance between said extremities, a centering disk slidably mounted upon said hinge pin within said space, and centering pins supported by said outer coupling members so as to occupy a common plane forming equal angles with said shafts, said centering pins disposed so as to extend across said space and into engageable relation with said centering disks, whereby action of said pins upon said disk maintains said hinge pin in an axis bisecting the angle between said shafts.

3. In a universal joint, a pair of complementary semi-cylindrical members, bearing brackets extending from each of said semi-cylindrical members and sharing a common axis, a journal pin interlocking said bearings and extending the full diameter of said semi-cylindrical members, said bearing brackets grouped adjacent the ends of said journal pin exposing the central portion of said journal pin, a centering disk slidably mounted upon the central portion of said journal pin, coupling members fitted upon each of said semi-cylindrical members and shiftable about an axis at right angles to said journal pin, shafts extending from said coupling members, and centering pins supported by said coupling members engageable with said centering disk, said centering pins disposed so as to occupy a common plane forming equal angles with said shafts, said centering disk arranged to maintain the axis of said journal pin at right angles to the common plane of said centering pins, and arcuate tongue and groove means formed in the axially disposed surfaces of said semi-cylindrical members and the corresponding surfaces of said coupling members for locking said coupling members against displacement radially from said semi-cylindrical members.

4. In a universal joint, a pair of yokes, a shaft extending from one side of each of said yokes, each of said yokes provided with an arcuate recess therein at the opposite side from said shaft, a pair of arcuate complementary connecting members arranged to fit in and be retained by said arcuate recesses, interlocking hinge means joining said connecting members, said yokes arcuately shiftable relative to their respective connecting members about a common center intersected by the axis of said hinge means and at right angles to the axis of their respective shafts, and centering means operatively connected to both of said yokes and to said hinge means whereby the axis of said hinge means is retained in a plane bisecting the angle between said shafts.

5. In a universal joint, a pair of yokes, a shaft extending from one side of each of said yokes, each of said yokes provided with an arcuate recess therein at the opposite side from said shaft, a pair of arcuate complementary connecting members arranged to fit in said arcuate recesses, hinge means joining said connecting members, said yokes arcuately shiftable relative to their respective connections about a common center intersected by the axis of said hinge means and at right angles to the axis of their respective shafts, a centering member, positioning means therefor supported by each of said yokes and arranged at right angles to the axis of the corresponding shaft, said positioning means occupying a common plane, and a centering pin extending from the axial portion of said centering member at right angles to the common plane of said positioning means, said centering pin operatively connected with said hinge means and coinciding with the axis thereof.

6. In a universal joint, a pair of yokes, a shaft extending from one side of each of said yokes, each of said yokes provided with an arcuate recess therein at the opposite side from said shaft, a pair of arcuate complementary connecting members arranged to fit in said arcuate recesses, hinge means joining said connecting members, said yokes arcuately shiftable relative to their respective connecting members about a common center intersected by the axis of said hinge means and at right angles to the axis of their respective shafts, a centering member, positioning means therefor supported by each of said yokes and arranged at right angles to the axis of the corresponding shaft said positioning means occupying a common plane, and means associated with said centering member and operatively connected with said hinge means for retaining the axis of said hinge means at right angles to the plane of said positioning means.

7. In a universal joint, a pair of yoke members, a coupling member for each yoke member interlocked therewith, a shaft extending from each yoke member, each yoke member being arcuately shiftable relative to its coupling member about an axis at right angles to the axis of said shaft, hinge means joining said coupling members, the axis on said hinge means being at right angles to the axes of arcuate movement of said yoke members, centering means in association with said yokes and said hinge means, and guide means associated with said yokes and said hinge means for maintaining the axis of said hinge means in a plane bisecting the angle between said shafts.

8. In a universal joint, a pair of yokes, a shaft extending from one side of each of said yokes, each of said yokes provided with an arcuate recess therein at the opposite side from said shaft, a pair of arcuate complementary connecting members arranged to fit in said arcuate recesses, hinge means joining said connecting members, said yokes arcuately shiftable relative to their respective connecting members about a common center intersected by the axis of said hinge means and at right angles to the axis of their respective shafts, centering means in association with said yokes and said hinge means, guide means associated with said yokes and said hinge means for maintaining the axis of said hinge means in a plane bisecting the angle between said shafts.

PAUL R. MORRISON.